United States Patent [19]
Stahl et al.

[11] 3,868,731
[45] Mar. 4, 1975

[54] CLOSED CYCLE WASTE TREATMENT SYSTEM AND METHOD

[76] Inventors: Oliver B. Stahl, 18 Garden Height Apts., Red Bud Rd., Calhoun, Ga. 30701; Carmen J. Paris, 706 Briarwood Dr., Melbourne, Ill. 60458

[22] Filed: Nov. 15, 1972

[21] Appl. No.: 306,601

[52] U.S. Cl.................... 4/10, 4/131, 203/DIG. 5
[51] Int. Cl. ... E03d 11/02, E03d 11/00, B60r 16/04
[58] Field of Search ............. 4/10, 9, 131, 118; 203/DIG. 5

[56] References Cited
UNITED STATES PATENTS

| | | | |
|---|---|---|---|
| 1,820,981 | 9/1931 | Fever | 4/172.17 |
| 2,678,450 | 5/1964 | Simpson et al. | 4/10 |
| 2,858,939 | 11/1958 | Corliss | 210/136 |
| 3,079,612 | 3/1963 | Corliss | 4/10 |
| 3,474,468 | 10/1969 | Blankenship | 4/131 |
| 3,623,165 | 11/1971 | Whittell, Jr. | 4/172.15 |
| 3,733,617 | 5/1973 | Bennett | 4/10 |

Primary Examiner—Henry K. Artis
Attorney, Agent, or Firm—Duckworth, Hobby & Allen

[57] ABSTRACT

A waste treatment system includes means for supplying a waste carrying fluid to a waste collection facility, and means adapted to be coupled to the waste collection facility for comminuting fluid-carried waste received therefrom. The comminuted fluid-carried waste is vaporized, and then constituents thereof are recondensed and returned to the supplying means.

13 Claims, 3 Drawing Figures

３,868,731

CLOSED CYCLE WASTE TREATMENT SYSTEM AND METHOD

BACKGROUND OF THE INVENTION

1. Field of the Invention

The present invention relates to waste treatment systems and methods, and in particular relates to such systems and methods which are designed to efficiently treat sewage at the collection facility.

2. Description of the Prior Art

Present day sewage treatment systems generally employ a network of pipes coupled to the waste collection facilities, i.e, toilets, washing machine outflows and the like, in single family dwellings, apartments and commercial establishments. This sewage is carried via water to a central treatment facility, where a number of treatment steps may be carried out. In theory such treatment systems are economical, because modern treatment can be carried out on a large scale.

However, modern day toilet equipment requires about 4.5 gallons of water per operation, or "flush," in order to achieve the necessary "carry" to the collected waste so as to keep solids therein in suspension. As a result, an average family of three persons uses between 75–100 gallons of water per day in this manner. This, of course, places an incredible demand on municipal water supplies. For example, a relatively small city of about 150,000 persons would require about 1.2 million gallons of water per day for toilet waste carry alone.

Accordingly there have been suggestions in the prior art to treat sewage at, or near, the collection facility thereby reducing or avoiding entirely the aforementioned carry water demand. Septic tanks represent such an arrangement, but have limitations with respect to drainage fields, absorbency of the soil, and so forth. In U.S. Pat. No. 3,474,468, Blankenship teaches an incinerator toilet that evaporates the carry water, reduces the solid waste to ash, and recondenses some of the vapor for reuse while the balance is vented. Dale, in U.S. Pat. No. 3,098,144, also discloses a mechanical toilet having a burner grid for effectuating sewage disposal. In U.S. Pat. No. 3,458,873 to Nordstedt et al., another electrically operated incinerator toilet is disclosed, in which a combustion technique is employed for sewage treatment.

Another arrangement is employed with trailers and similar recreational vehicles in which the collected sewage is injected into the manifold of the vehicle's internal combustion engine to achieve incineration. Various other sewage incineration techniques are disclosed in the following U.S. Pat. Nos: 1,818,586; 1,892,132; 2,565,720; 2,858,778; 3,320,907 and 3,522,613.

SUMMARY OF THE INVENTION

The system of the present invention and the method incorporated therein comprises means for supplying a waste carrying fluid and adapted to be coupled to a waste collection facility. Means are adapted to be coupled to the waste collection facility for receiving and comminuting the waste-carry fluid, and means for vaporizing the comminuted fluid-carried waste. The system further includes means for receiving and condensing the vaporized fluid-caried waste combination and returning constituents thereof to the supplying means.

THE DRAWING

DETAILED DESCRIPTION

The system of the present invention and the method incorporated therein will now be described with reference to FIGS. 3–3.

Figure 1:
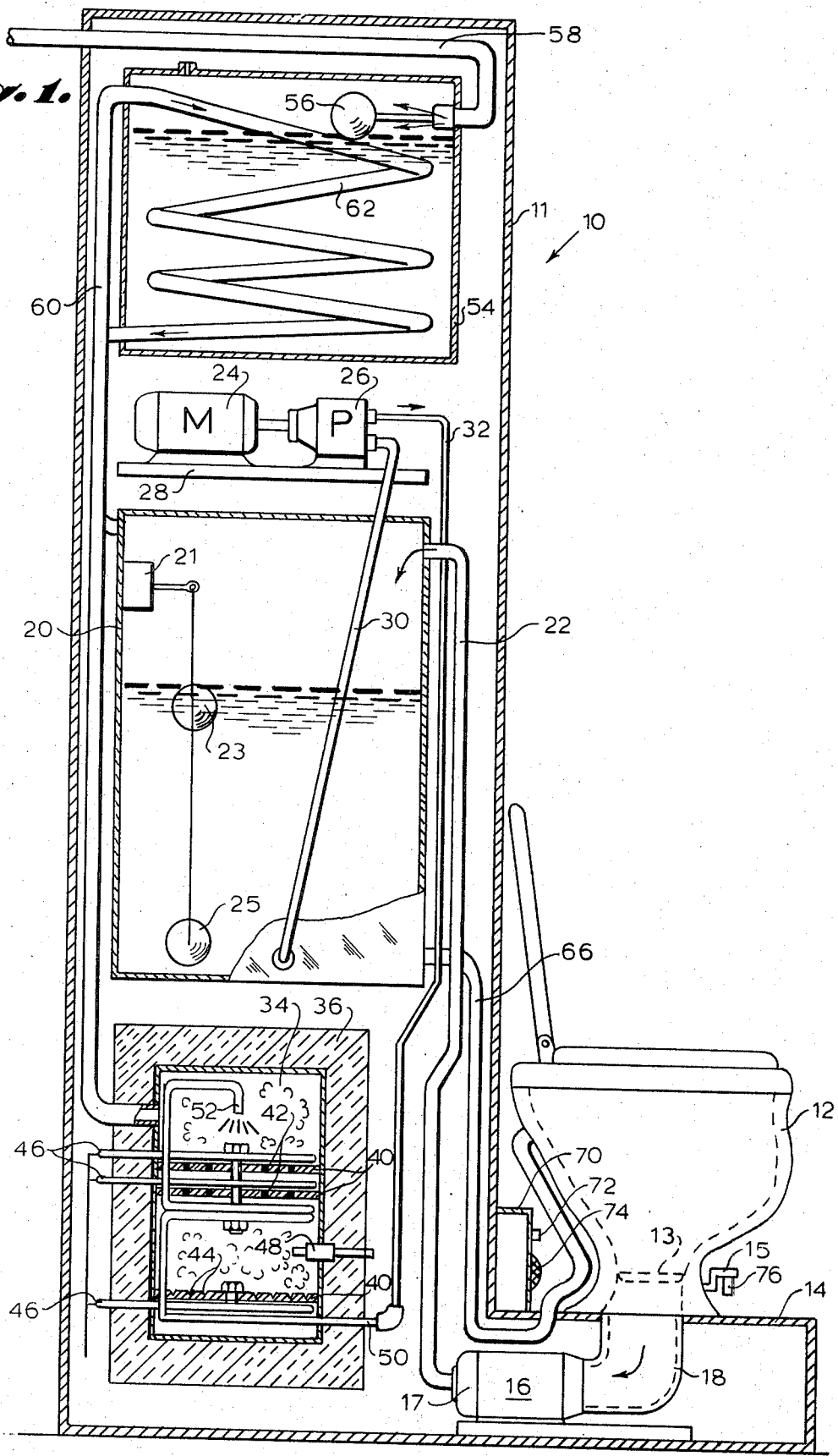
FIG. 1 is a side elevation, partially in cross section, of a system in accordance with the present invention.

Noting FIG. 1, the apparatus employed in this embodiment of the present system includes a generally L-shaped hollow casing 10 having a vertical leg 11 and a bottom leg 14, with a toilet 12 mounted on the top of the bottom leg. The size, shape and materials used for the casing 10 are not critical. For example the casing 10 may comprise a wooden or aluminum sheeting. The toilet 12 includes a foot pedal 15 adapted to operate a valve 13 at the bottom of the toilet.

A comminuting apparatus 16 is mounted inside the bottom leg 14 of the casing 10, and communicates with the toilet 12 via a relatively large diameter pipe 18. The comminuting apparatus 16 suitably comprises any one of a variety of commercially available, electrically operated pulverizers, blenders, grinders, or the like, which is capable of uniformly reducing the particulate size of raw human waste solids to on the order of 5 microns. Electrical operation of the comminutor 16 and other of the electrical apparatus sst forth will be described in detail with reference to FIG. 3. A small volume gear pump 17 is associated with the output end of the comminutor 16.

A holding tank 20 is mounted in the vertical leg 11 of the casing 10 and communicates with the comminutor-pump 16, 17 via a pipe 22 which enters the top of the tank. A switch 21 operated by an upper and a lower float 23, 25, respectively, is disposed within the holding tank 20. A motor 24 and a pump 26 are supported by a bracket 28 positioned above the holding tank 20. Another pipe 30 is fixed between the bottom of the holding tank 20 and the pump 26. The motor 24 and the pump 26 are arranged such that the motor drives the pump, drawing comminuted water carried waste out of the holding tank 20 via the pipe 30 for delivery into a small diameter pipe 32 (on the order of ⅛ inch pipe, for example) which is coupled to the pump. While a wide variety of motor-pump arrangements may be employed, we have found suitable a combination of a 1,750 rpm motor geared down to operate a reciprocal pump at 2 rpm. This arrangement delivers about 8 ounces of comminuted water carried waste per minute to a heating chamber 34, described next.

The heating chamber 34 is mounted at the bottom of the vertical leg 11 of the casing 10. The heating chamber 34 is surrounded by a high temperature insulating material 36, such as marionite, for example. A plurality of vertically spaced flash plates 40 are disposed within the heating chamber 34. The upper ones of the flash plates 40 have apertures 42 therethrough and the lower plate has indentations 44 on the upper surface thereof. A plurality of annular, vertically spaced heating elements 46 are disposed in the heating chamber and between adjacent flash plates 40. A thermostat 48 extends into the heating chamber 34.

The small diameter pipe 32 extends to just outside the heating chamber 34 where that pipe is joined to a temperature resistant tube 50, preferably comprising stainless steel. The tube 50 extends into the heating chamber 34 and is formed so as to make several helical turns therein, with one end 52 of the pipe forming a nozzle extending downwardly towards the flash plates 40 and the heating elements.

With continuing reference to FIG. 1, a cooling tank 54 is positioned at the top of the vertical leg 11 of the casing 10. A flat valve 56 controls the inflow of water via a pipe 58 into the cooling tank 54. A temperature resistant pipe 60 communicates with the heating chamber 34 and extends upwardly into the cooling tank 54. Inside the cooling tank 54, the pipe 60 forms a helical condensing coil 62 which extends out of the cooling tank 54 and into a carry-fluid supply tank 64 (note FIG. 2) disposed adjacent to hold tank 20 in the vertical leg 11. A supply pipe 66 is coupled between the bottom of the supply tank 64 and the toilet 12.

Figure 2:
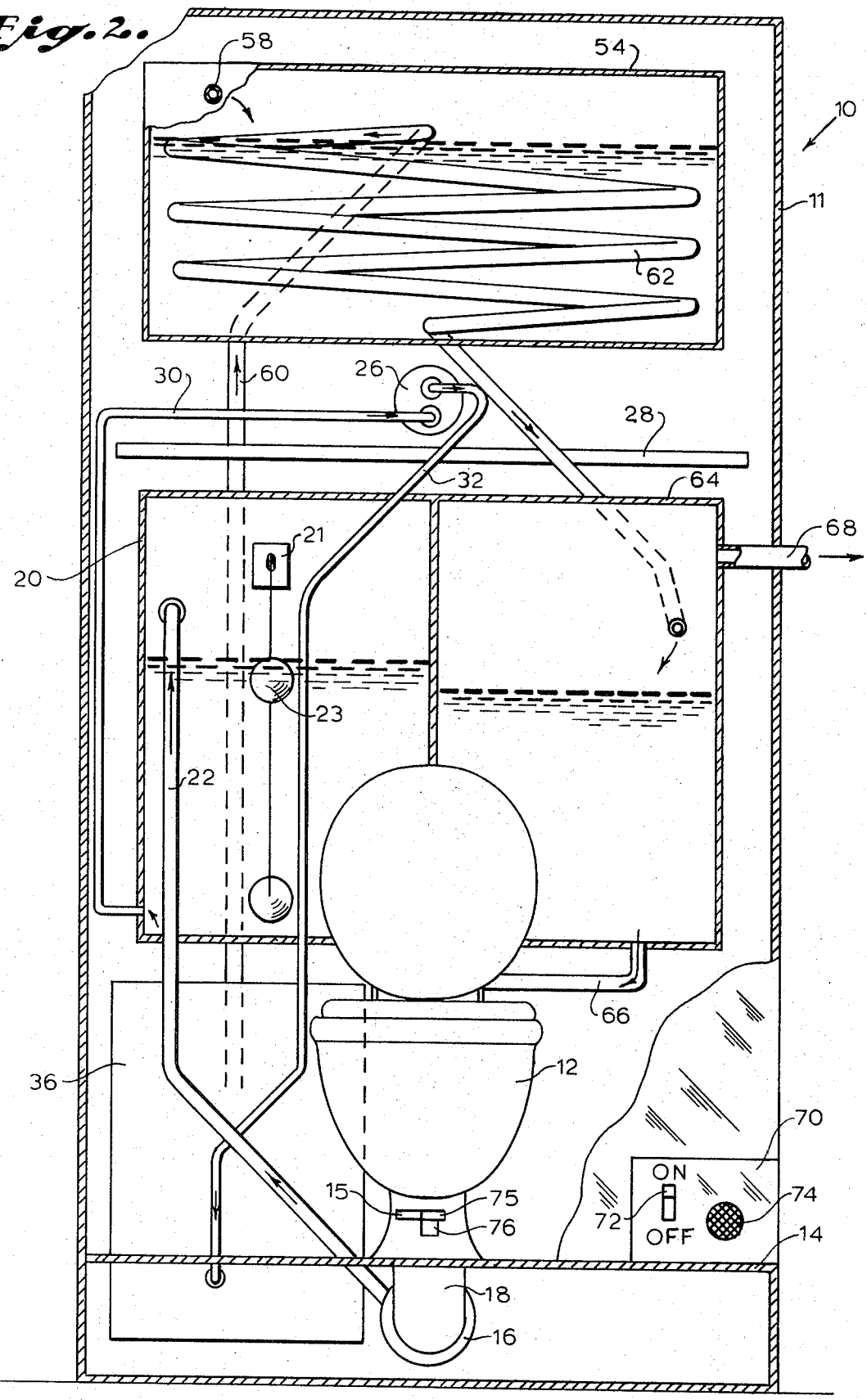
FIG. 2 is a front elevation, partially in cross section, of the system of FIG. 1.

Referring now to FIG. 2, the supply tank 64 includes an overflow tube 68 along the side wall thereof. The size, shape and materials used for the holding, cooling and supply tanks 20, 54 and 64, respectively, are not critical. By way of example, all three may be fabricated from plastic.

As shown in FIG. 2, an electrical control unit 70 is mounted on the casing 10. The control unit 70 includes a power switch 72 and an indicator bulb 74. A manually operated flush foot pedal 75 is affixed to the outside of the casing 10, with a microswitch 76 affixed to the bottom thereof. Control unit 70 is electrically coupled with the comminutor 16, the holding tank switch 21, the motor 24, the heating elements 46, the thermostat 48 and the microswitch 76 as shown by block diagram in FIG. 3. A variety of actual circuit configurations may be employed to achieve electrical control of the overall system which is described next.

Figure 3:
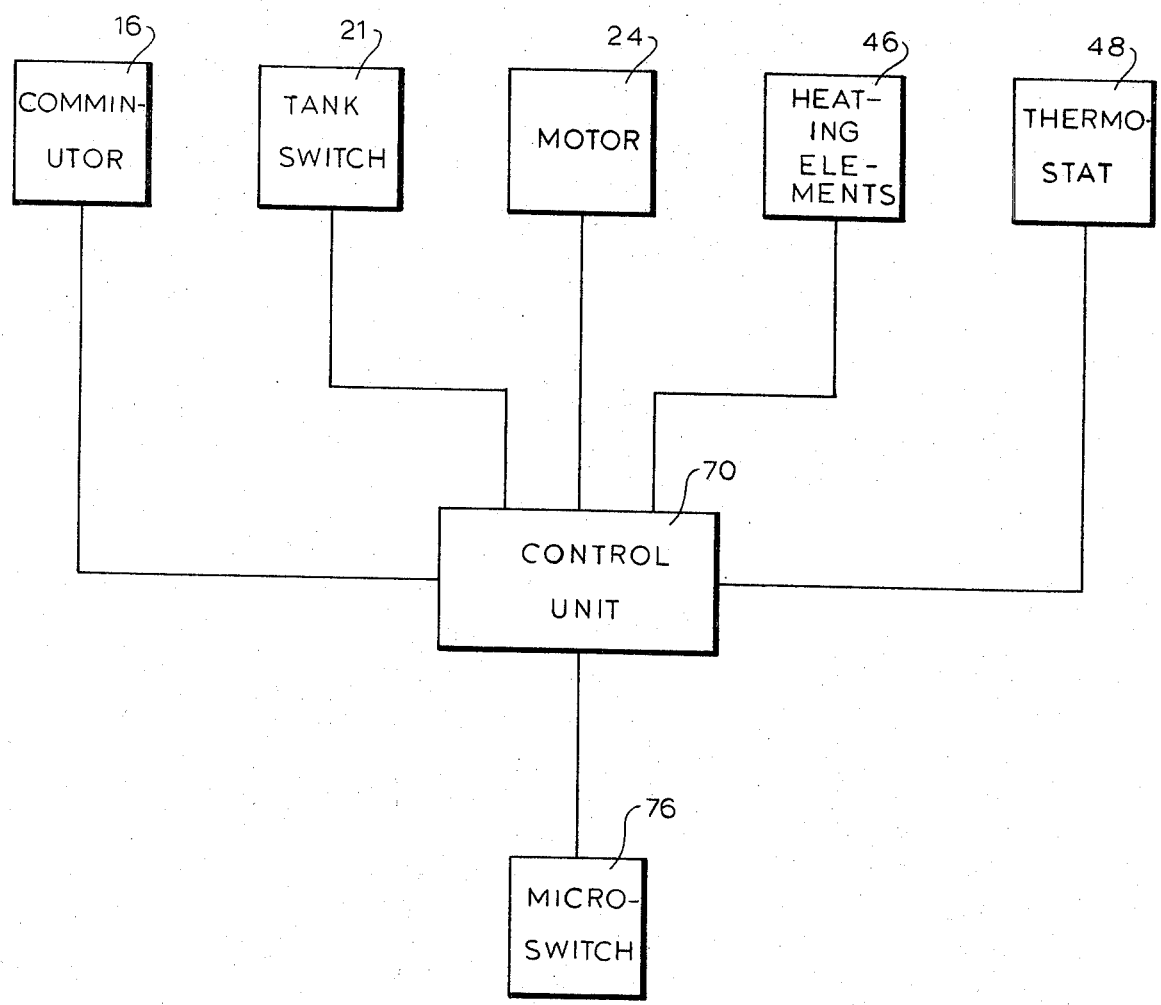
FIG. 3 is a block diagram of an electrical circuit arrangement employed in the system of FIGS. 1 and 2.

Referring now to FIGS. 1, 2 and 3, after waste is deposited in the toilet 12, the foot pedal 15 is depressed to open the valve 13 and allow the water-carried waste to enter the pipe 18. Thereafter, the microswitch 76 is energized by pressing foot pedal 75. Simultaneously, the comminutor 16 is energized, thereby receiving the water carried waste from the toilet 12 and comminuting the waste to a fine particulate size on the order of 5 microns. Comminution is easily effected, since normal human waste comprises about 99 percent water. Preferably, the comminutor 16 is allowed to operate for a period of about 45 seconds.

The comminuted water carried waste is then forced into the holding tank 20 via pipe 22 by the pump 17. When the level of the water-carried waste in the holding tank 20 raises the float 23 to a predetermined level, the tank switch 21 is closed. With the tank switch 21 closed, the control unit 70 supplies current to the heating element 46 for a period of time to heat the heating chamber 34 to a predetermined temperature (for example at 1,150° F.) at which event the thermostat 48 senses the predetermined temperature, causing the control unit 70 to turn off the heating elements 46. Simultaneously, the control unit 70 energizes the motor 24, thereby operating the pump 26 to draw the comminuted water-carried waste out of the holding tank 20 into the tube 32, and thereafter through the high temperature tubing 50 in the heating chamber 34. The water carried waste is super-heated during the passage through the tubing 50, and is almost completely vaporized as it passes out of the nozzle 52. Any unvaporized liquid falls through the apertures 42 in the upper flast plates 40, and into the indentations 44 in the lower flash plate to insure a complete vaporization of all of the water-carried waste at a temperature well above its boiling point. When the thermostat 48 senses a temperature in the heating chamber 34 below a given level, the control unit 70 again supplies current, as needed, to the heating elements 46.

A pressure somewhat above normal atmospheric pressure (about 5 psi) is developed in the heating chamber 34 during vaporization, causing the vapor to rise into the delivery pipe 60 and through the condensing coil 62. The cooling tank 54 is filled with a cooling fluid, such as water, facilitating the recondensation of the water constituents of the comminuted water-carried waste previously vaporized in the heating chamber 34. The recondensed water then flows into the supply tank 64, from which water is supplied to the toilet 12, as needed, to again initiate the operation just described.

In the above system we have found that about 1.5 quarts of water is sufficient to provide the necessary water-carry for each flushing operation. Therefore, a holding tank having a 10-15 gallon capacity is sufficient to hold enough comminuted water-carried waste such that the heating chamber 34 may only be energized once a day for an average family of three persons.

Various modifications may be made with the above apparatus without departing from the scope and spirit of the present invention. For example, the various components may be rearranged in a configuration other than that shown and described.

I claim:

1. A waste treatment system comprising:
   means for supplying a waste carrying fluid, said supplying means adapted to be coupled to a waste collection facility;
   means adapted to be coupled to said waste collection facility for receiving and comminuting fluid-carried waste therefrom;
   means for vaporizing said comminuted fluid-carried waste; and
   means for receiving and condensing said vaporized fluid-waste combination and returning constituents thereof to said supplying means.

2. A system as recited in claim 1 wherein said vaporizing means comprises:
   a chamber;
   at least one flash plate within said chamber;
   means for heating said flash plate to a temperature substantially above the vaporizing temperature of said fluid; and
   means for directing said fluid against said flash plate.

3. A system as recited in claim 2 further comprising means for superheating said fluid prior to entering said directing means.

4. A system as recited in claim 3 further comprising a plurality of vertically spaced flash plates, the upper ones of said flash plates having apertures to facilitate flow of any of said superheated fluid therethrough.

5. A system as recited in claim 4 wherein said superheating means comprises a helical pipe disposed in said chamber, one end of said pipe having a nozzle thereon comprising said directing means.

6. A system as recited in claim 5 wherein said heating means comprises annular heating elements disposed in said chamber adjacent said flash plates.

7. A system as recited in claim 1 wherein said waste-carry fluid, said waste and said returned constituents consist essentially of water.

8. A system as recited in claim 1 further comprising:
means for receiving and holding said comminuted fluid-carried waste from said comminuting means; and
means for communicating with said holding means for pumping said fluid-carried waste into said vaporizing means.

9. A system as recited in claim 8 comprising electric circuit means responsive to a predetermined level of said comminuted fluid-carried waste in said holding means for energizing said vaporizing means, and further comprising means for energizing said pumping means responsive to a predetermined temperature in said chamber.

10. A system as recited in claim 1 wherein said condensing means comprises:
a condensing chamber;
a helical tube disposed in said condensing chamber and communicating at one end with said vaporizing means; and
a cooling fluid in said condensing chamber surrounding said helical tube.

11. A system as recited in claim 10 further comprising the other end of said tube communicating with said supplying means.

12. A system as recited in claim 1 further comprising electric circuit means responsive to a manually operated switch for delivering said waste-carried fluid to said waste collection facility and simultaneously energizing said comminuting means.

13. A waste treatment system comprising:
a toilet adapted to collect waste;
a holding tank communicating with said toilet and adapted to receive fluid-carried waste therefrom;
communicating means interposed between said toilet and said holding tank;
a heating chamber having heating elements disposed therein, said chamber communicating with said holding tank for receiving and vaporizing said fluid-carried waste;
means for pumping said fluid-carried waste out of said holding tank and into said heating chamber;
electric circuit means for energizing said heating element responsive to a predetermined level of said fluid-carried waste in said holding tank, and responsive to a predetermined temperature in said heating chamber for energizing said pumping means;
a cooling tank spaced from said chamber;
a helical condensation coil disposed in said cooling tank, one end of said coil communicating with said heating chamber;
a fluid supply tank, the other end of said condensation coil communicating therewith; and
said supply tank communicating with said toilet.

* * * * *